US012550907B2

(12) United States Patent
Poston et al.

(10) Patent No.: US 12,550,907 B2
(45) Date of Patent: Feb. 17, 2026

(54) HUB CONVERTER

(71) Applicants: Michael Poston, Casar, NC (US); William K Wood, Mt. Ulla, NC (US); Ellis Clif Haislip, Laurel Hill, NC (US); Harry A. Batty, III, Limestone, TN (US); Meir Toshav, Floral Park, NY (US)

(72) Inventors: Michael Poston, Casar, NC (US); William K Wood, Mt. Ulla, NC (US); Ellis Clif Haislip, Laurel Hill, NC (US); Harry A. Batty, III, Limestone, TN (US); Meir Toshav, Floral Park, NY (US)

(73) Assignee: Matteo Industrial Products LLC, Denver, NC (US)

( * ) Notice: Subject to any disclaimer, the term of this patent is extended or adjusted under 35 U.S.C. 154(b) by 0 days.

(21) Appl. No.: 19/038,346

(22) Filed: Jan. 27, 2025

(65) Prior Publication Data

US 2025/0241326 A1 Jul. 31, 2025

Related U.S. Application Data

(60) Provisional application No. 63/625,768, filed on Jan. 26, 2024.

(51) Int. Cl.
*A22C 21/00* (2006.01)
*A22C 21/02* (2006.01)

(52) U.S. Cl.
CPC .................... *A22C 21/022* (2013.01)

(58) Field of Classification Search
CPC ............... A22C 21/022; B25J 11/0045
USPC .............................................. 452/71
See application file for complete search history.

(56) References Cited

U.S. PATENT DOCUMENTS

| 2005/0221745 | A1* | 10/2005 | Turner | A22C 21/022 |
| | | | | 452/88 |
| 2016/0037789 | A1* | 2/2016 | Goodyear, Jr. | A22C 21/022 |
| | | | | 452/71 |
| 2019/0320668 | A1* | 10/2019 | Batty, Jr. | A22C 21/022 |
| 2025/0241326 | A1* | 7/2025 | Poston | A22C 21/022 |

* cited by examiner

*Primary Examiner* — Richard T Price, Jr.
(74) *Attorney, Agent, or Firm* — Blake E. Vande Garde; AVEK IP, LLC

(57) ABSTRACT

Hub adaptor to convert an existing hub (i.e., old fashioned finger plate assembly, a single plate assembly) which requires each individual finger to be pulled in physically by either pliers or finger pullers, to one compatible with a modern quick change finger system, or other two-plate systems.

19 Claims, 12 Drawing Sheets

HUB CONVERTER

FIELD OF INVENTION

The present invention pertains poultry defeathering devices and more specifically to a device with a mounting structure which facilitates the efficient and simple removal and replacement of the fingers used by the device as they wear out.

BACKGROUND OF THE INVENTION

Millions of tons of poultry are raised, processed and brought to market yearly throughout the world. In 2016, in the United States alone, over 8.78 billion broiler chickens were produced and over 244 million turkeys were produced with a value in excess of $32 billion dollars. Poultry is processed in an efficient manner by shackling, stunning, bleeding, scalding, picking, eviscerating, washing, chilling, carving and deboning. Machines replaced workers plucking the feathers of poultry in poultry plants decades ago. Modern picking machines generally include a disc or drum onto which fingers are secured. Several discs are positioned along the sides of a path traversed by a chain/shackle carrying the poultry through the machine. The discs are rapidly rotated, ensuring that the fingers contact as much of the outer surface of each bird as possible. These fingers then "pick" the feathers off each poultry carcass as it passes through the machine via chain/shackle. Unfortunately, the fingers often crack, break or wear out at a significant rate due to the friction involved in the de-feathering process. This makes it necessary to replace thousands of fingers each month for each processing line.

A plurality of fingers are mounted to each disc or drum. Fingers are generally shaped having a larger base, a tapered body and a smaller diameter tip end. The tapered body is often ribbed, and most fingers include a groove located next to the base. Each disc has a plurality of openings large enough for the body of each finger to fit through, but small enough to abut the base diameter. Each finger is secured by pulling the finger through a hole and seating the hole within the finger groove. A typical picking line will include four defeathering machines. Each machine has 640 or more fingers making each line use in excess of 2500 fingers to de-feather poultry and each machine utilizes water sprays to continually wash feathers off both the fingers and the poultry as its processed. This creates a very slippery environment.

Replacement of fingers in previous plucking machines is both difficult and time consuming. Each finger must first be cut off by hand. This process is labor intensive and dangerous as it involves the use of a blade in a tight, awkward environment. A replacement finger is then inserted into the vacant opening and pulled, often with some form of plier, to seat the opening within the groove. Plucking machines utilizing a plurality of feather stripping fingers are the favored method for de-feathering chickens. Unfortunately, the design is lacking in efficient finger replacement.

In recent years, new, more efficient designs have emerged to aid in making the replacement of fingers both safer and more efficient. Unfortunately, replacing the old devices with machines or hubs which can accommodate the new designs is again both costly and inefficient. Thus, there is clearly a need for a more efficient and cost-effective device and method to facilitate transition to the new, efficient designs to aid in the removal and replacement of fingers within a picking machine. The instant invention alleviates the issues detailed above.

SUMMARY OF THE INVENTION

Hub adaptor to convert an existing hub (i.e., old fashioned finger plate assembly, a single plate assembly) which requires each individual finger to be pulled in physically by either pliers or finger pullers, to one compatible with a modern quick change finger system, or other two-plate systems.

DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION

Figure 1:
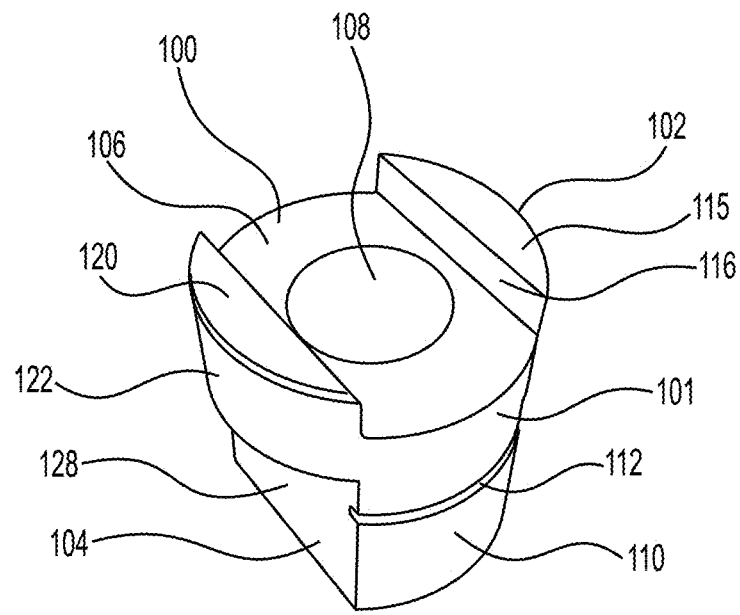
FIG. 1 is a proximal view of a hub adaptor in one embodiment of the instant invention.
Figure 2:
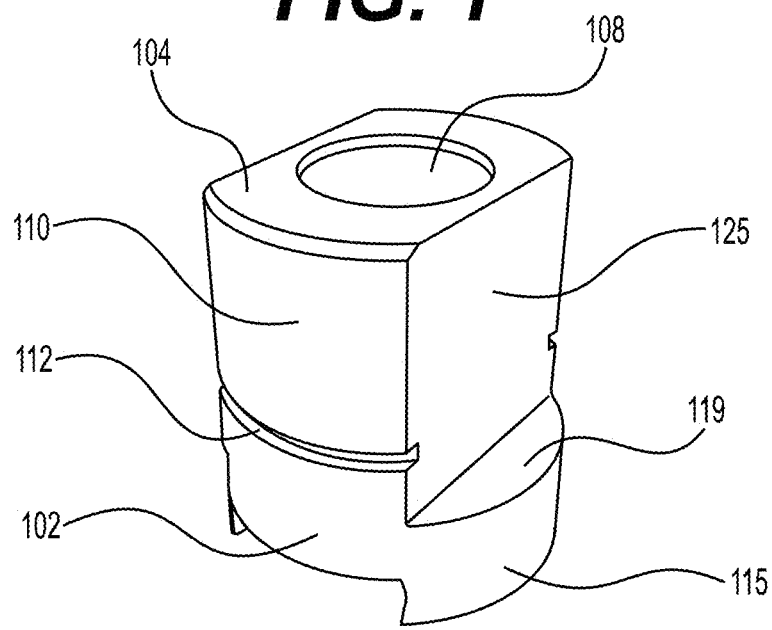
FIG. 2 is a proximal view of a hub adaptor in one embodiment of the instant invention.
Figure 3:
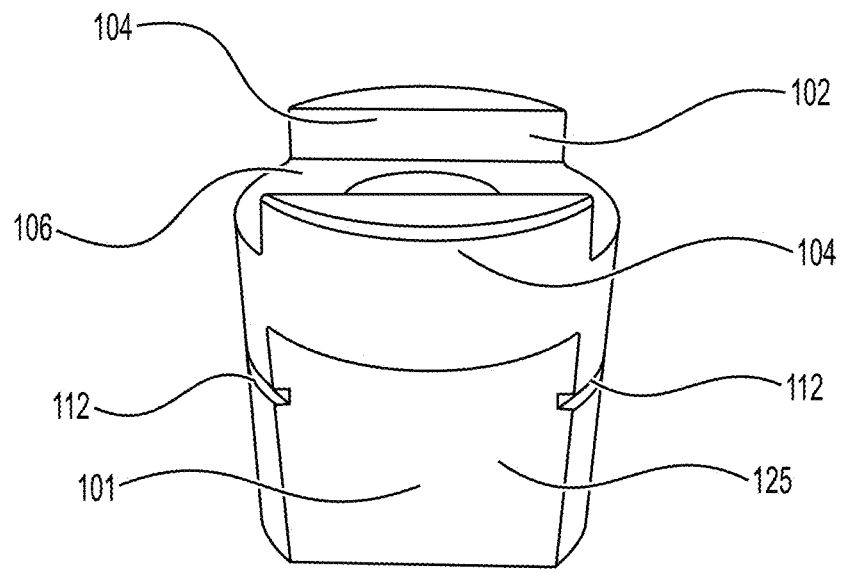
FIG. 3 is a side proximal view of a hub adaptor in one embodiment of the instant invention.
Figure 4:
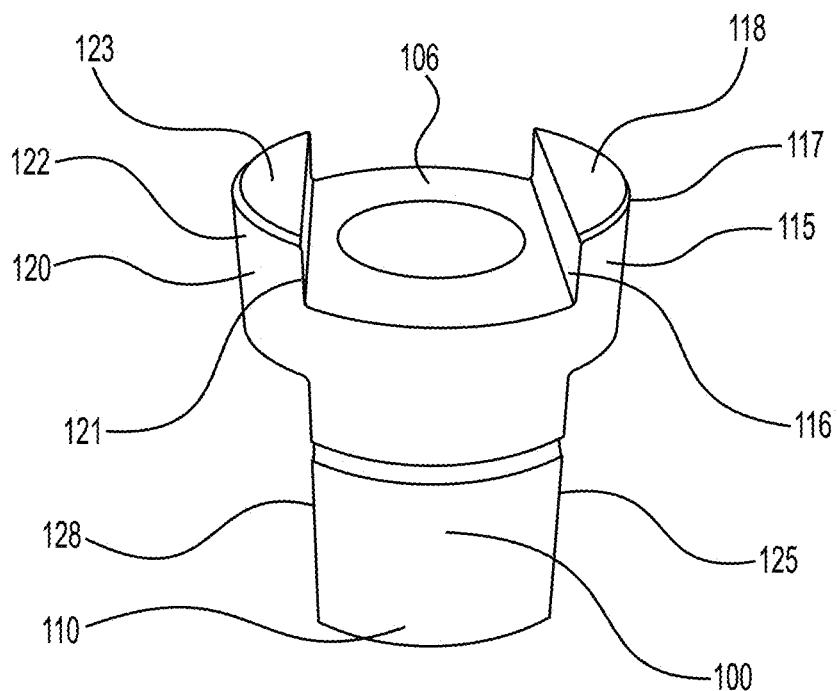
FIG. 4 is a side proximal view of a hub adaptor in one embodiment of the instant invention.
Figure 5:
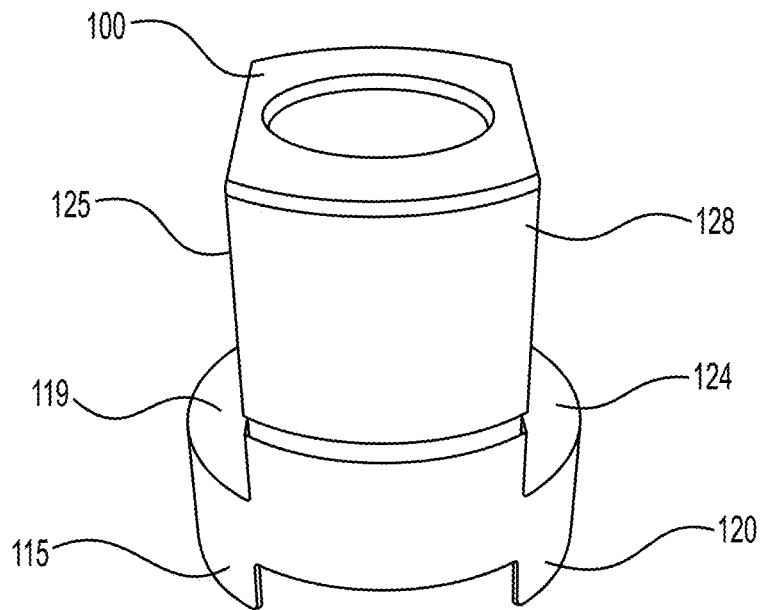
FIG. 5 is a side proximal view of a hub adaptor in one embodiment of the instant invention.
Figure 6:
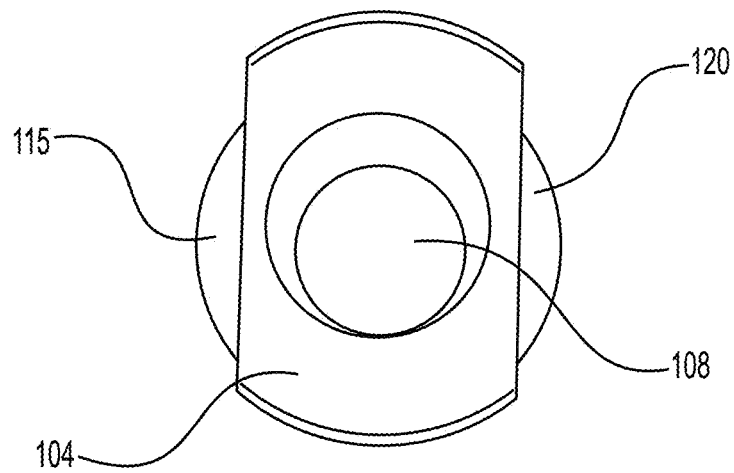
FIG. 6 is a bottom view of a hub adaptor in one embodiment of the instant invention.
Figure 7:
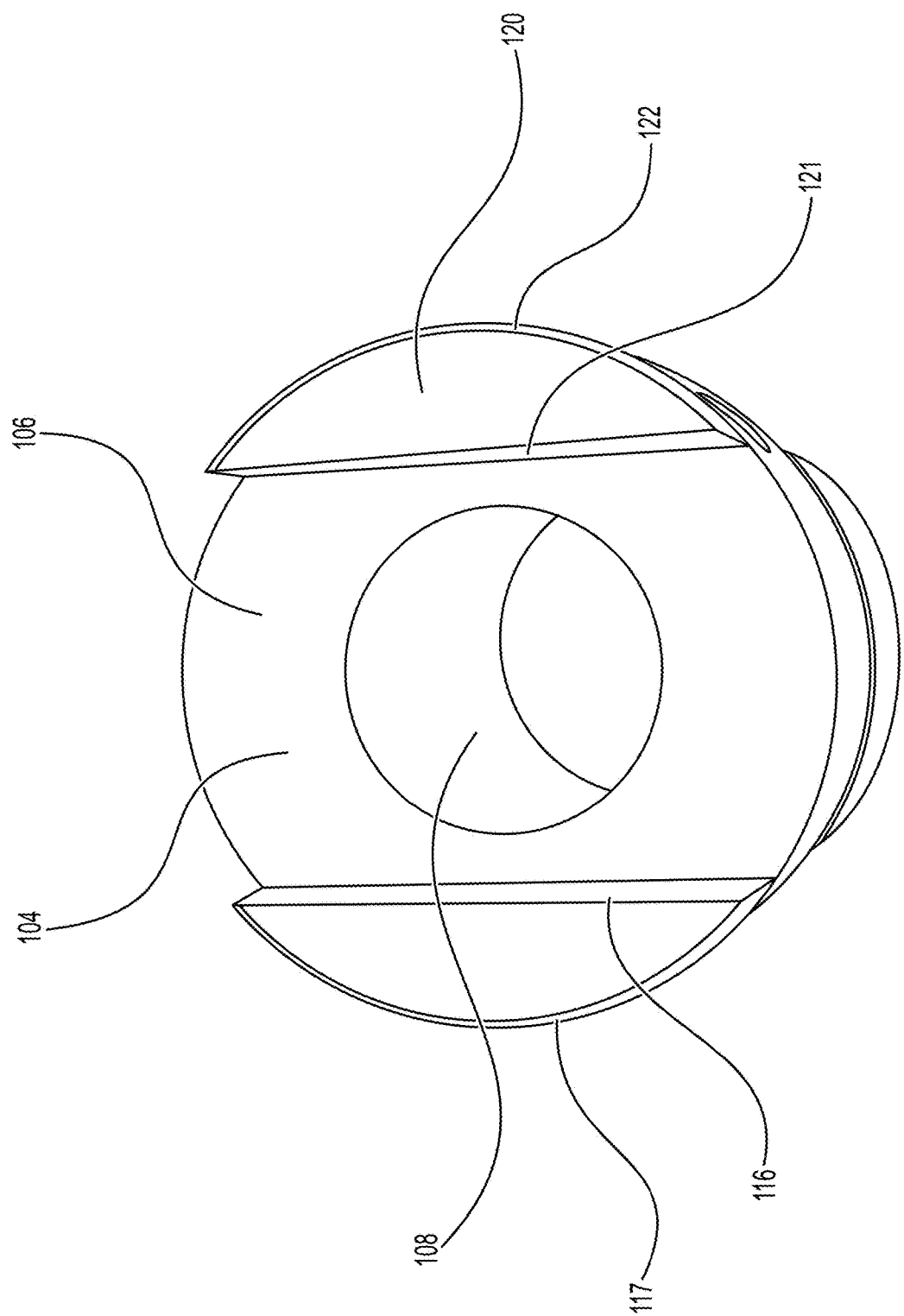
FIG. 7 is a top view of a hub adaptor in one embodiment of the instant invention.
Figure 8:
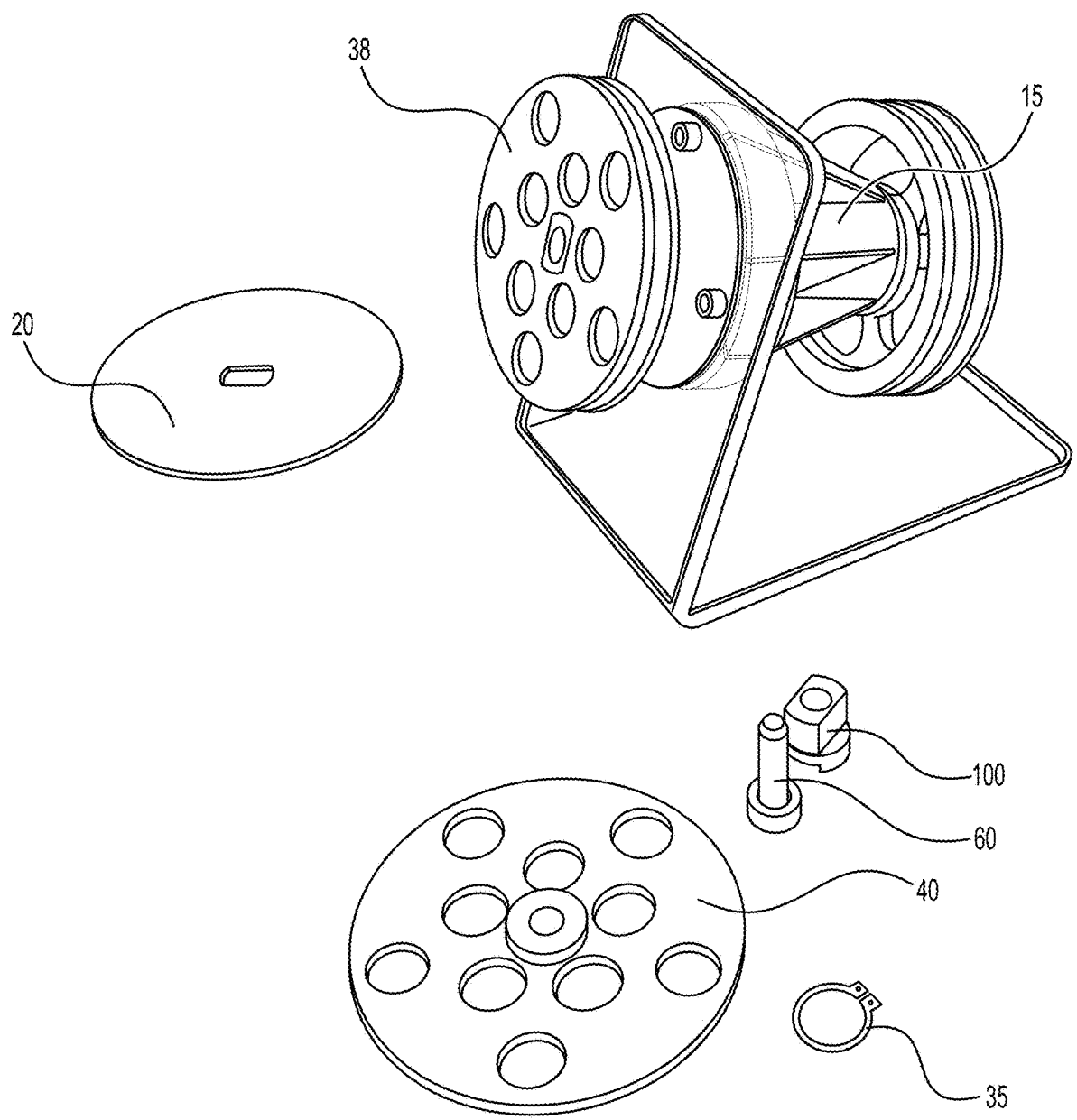
FIG. 8 is a proximal view of the process of installing one embodiment of a hub adaptor of the instant invention.
Figure 9:
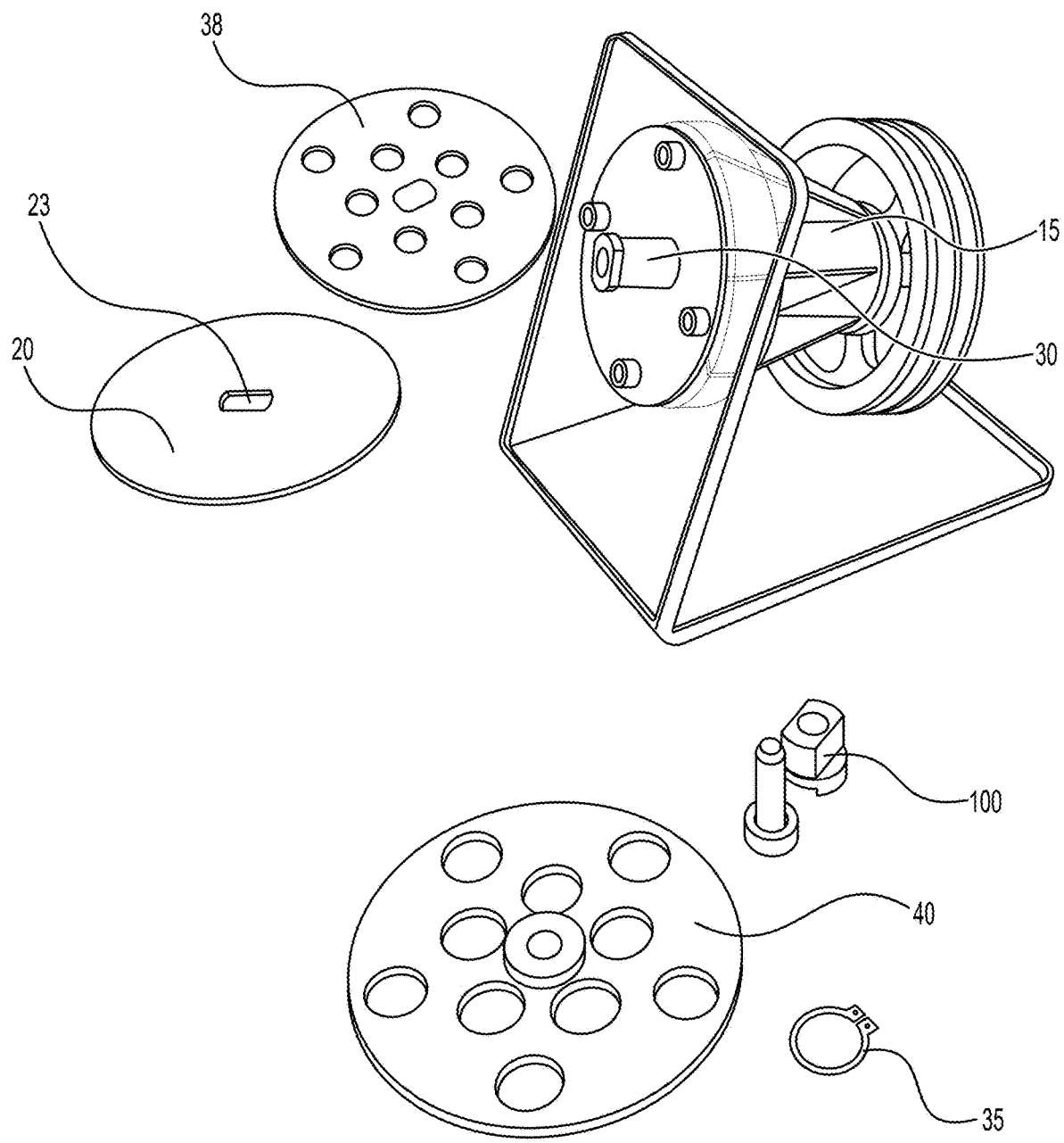
FIG. 9 is a proximal view of the process of installing one embodiment of a hub adaptor of the instant invention.
Figure 10:
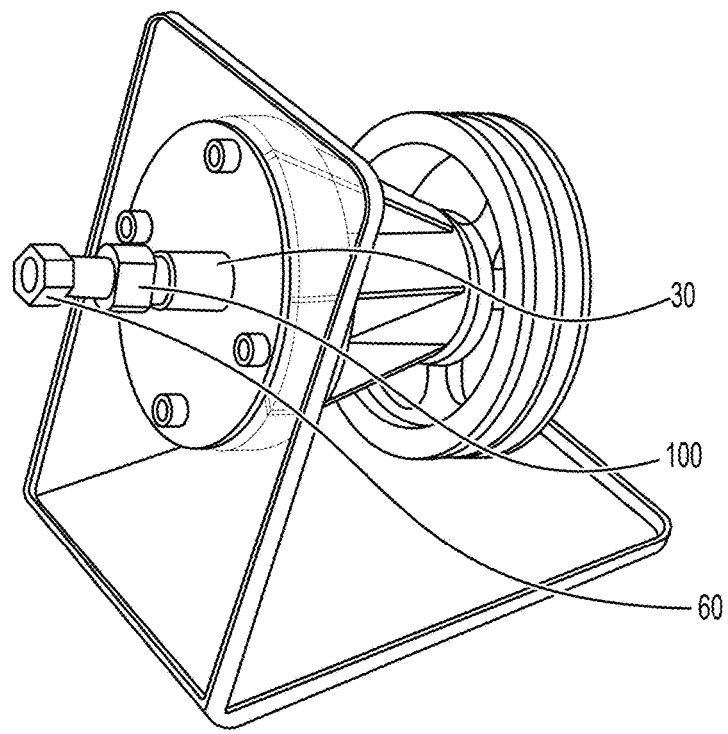
FIG. 10 is a proximal view of the process of installing one embodiment of a hub adaptor of the instant invention.
Figure 11:
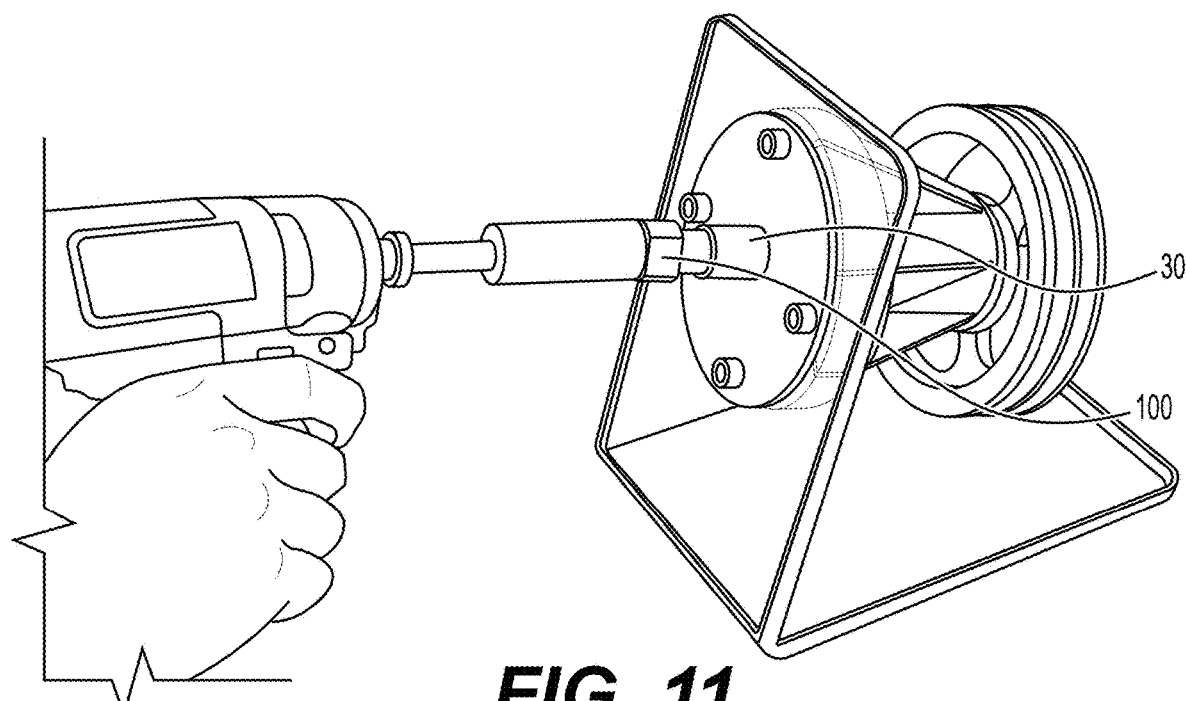
FIG. 11 is a proximal view of the process of installing one embodiment of a hub adaptor of the instant invention.
Figure 12:
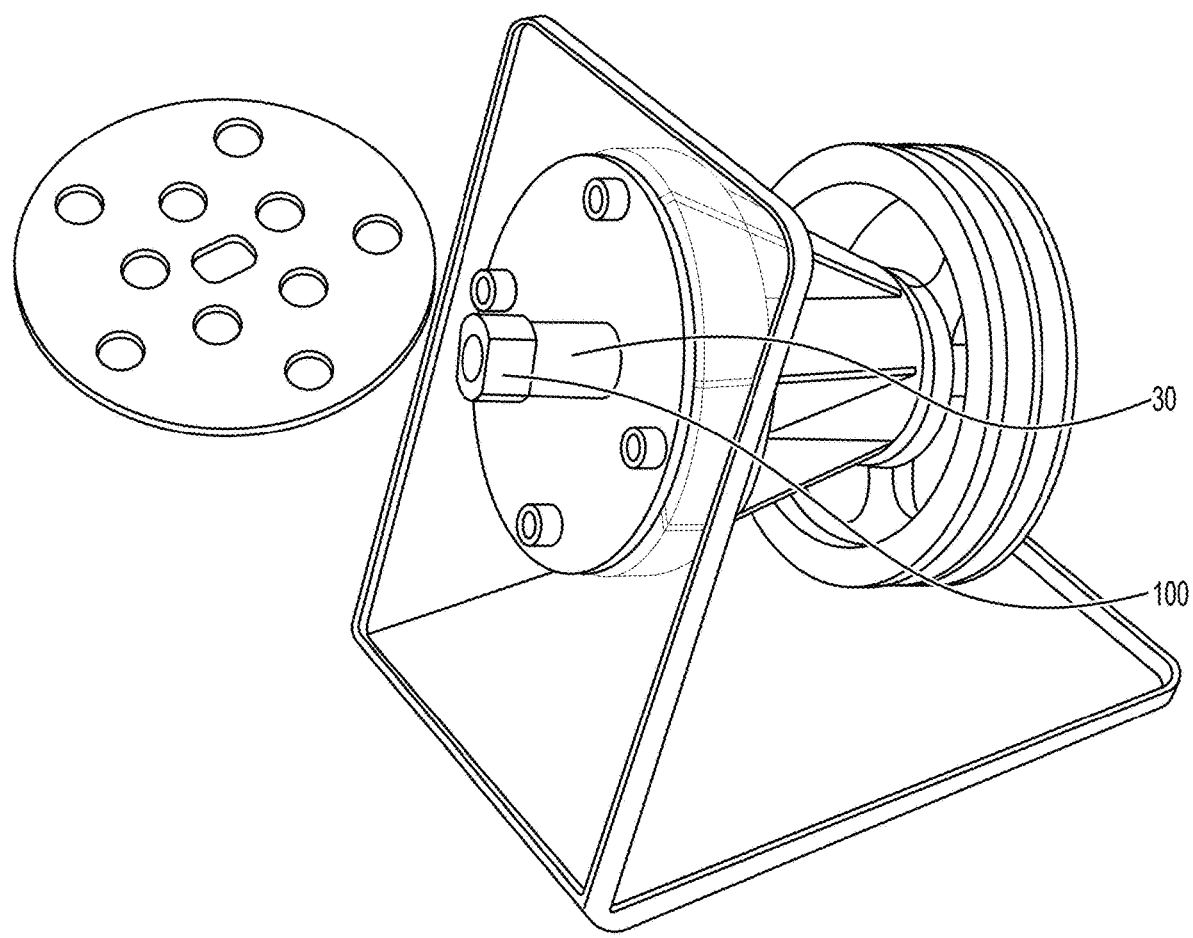
FIG. 12 is a proximal view of the process of installing one embodiment of a hub adaptor of the instant invention.
Figure 13:
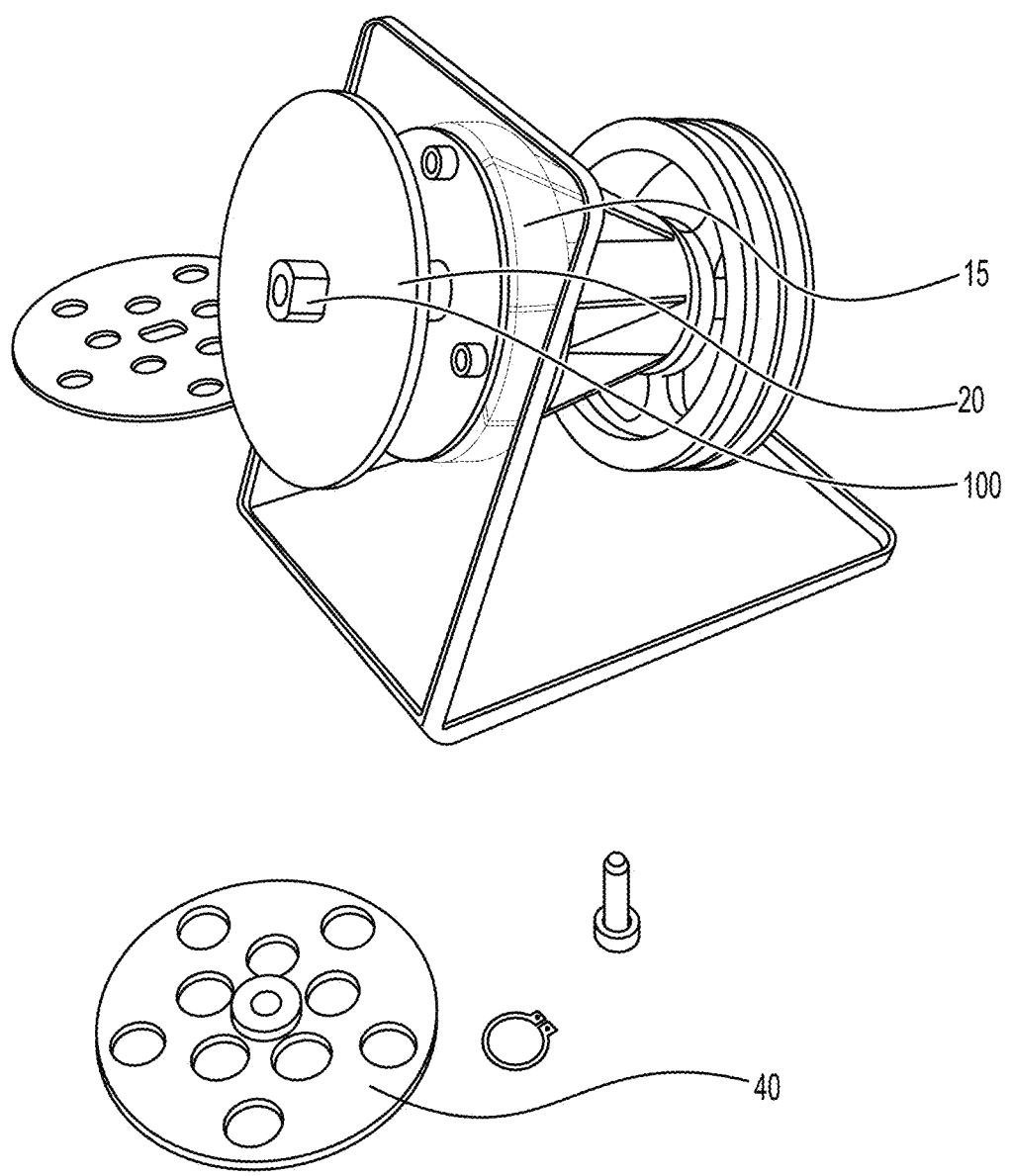
FIG. 13 is a proximal view of the process of installing one embodiment of a hub adaptor of the instant invention.
Figure 14:
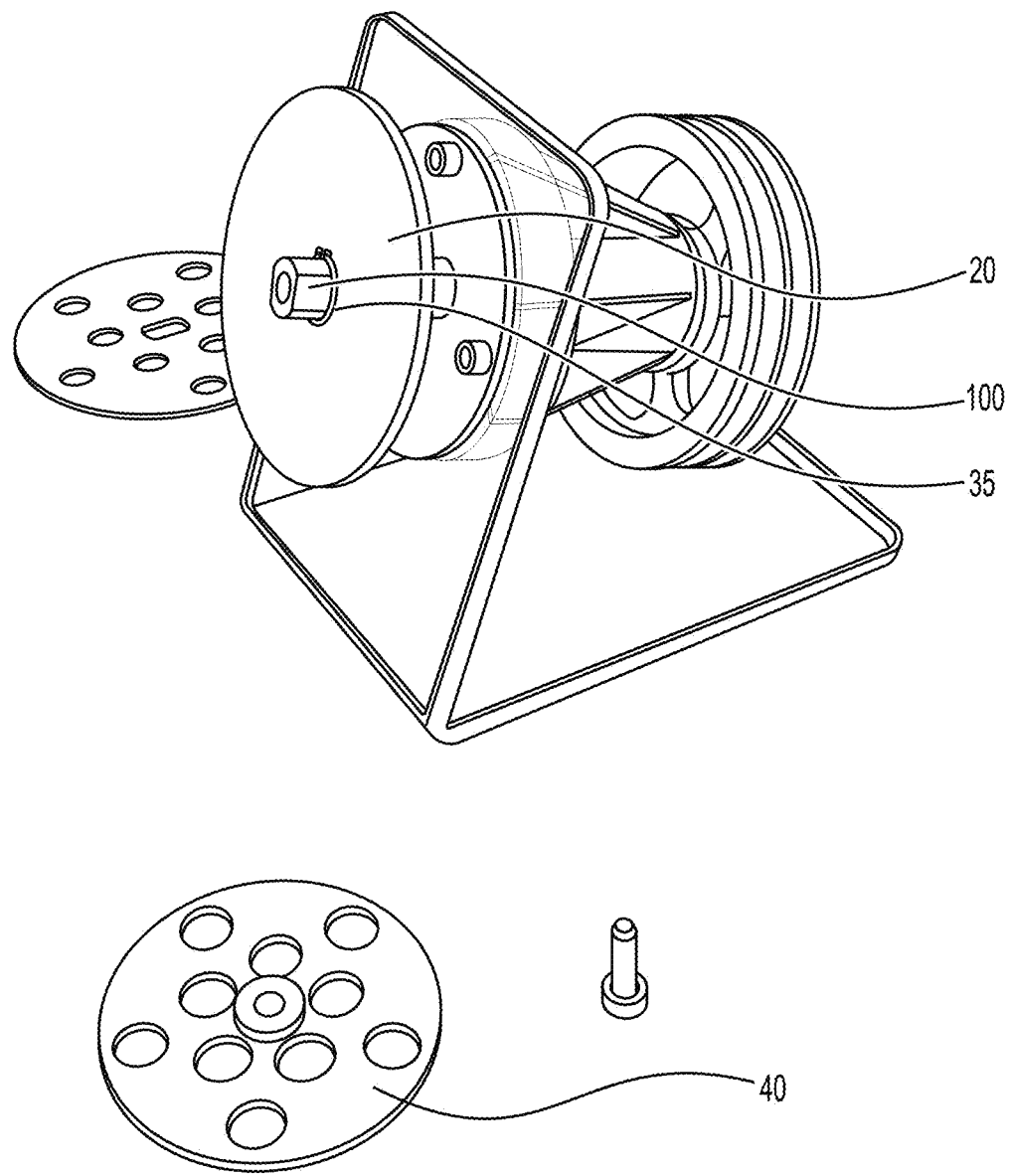
FIG. 14 is a proximal view of the process of installing one embodiment of a hub adaptor of the instant invention.
Figure 15:
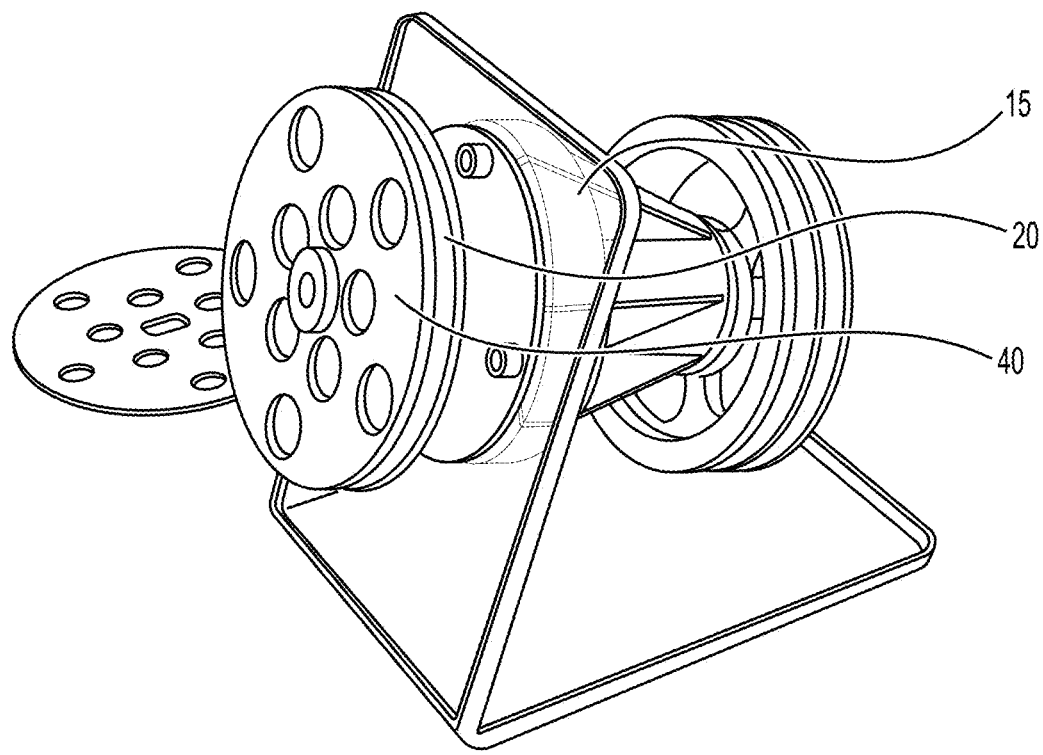
FIG. 15 is a proximal view of the process of installing one embodiment of a hub adaptor of the instant invention.
Figure 16:
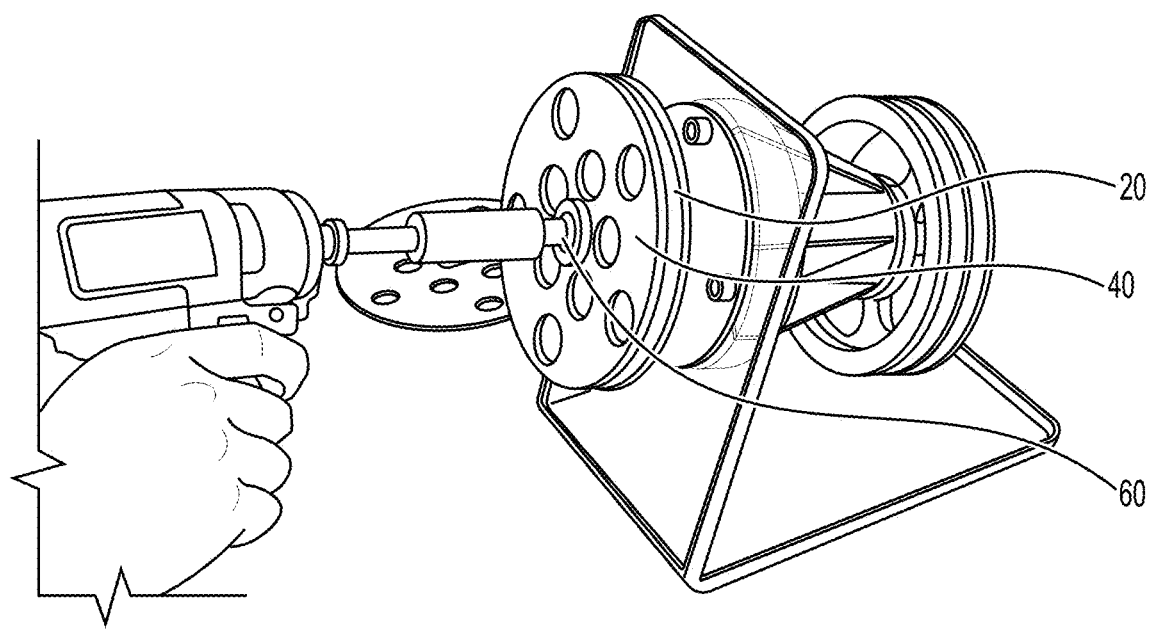
FIG. 16 is a proximal view of the process of installing one embodiment of a hub adaptor of the instant invention.
Figure 17:
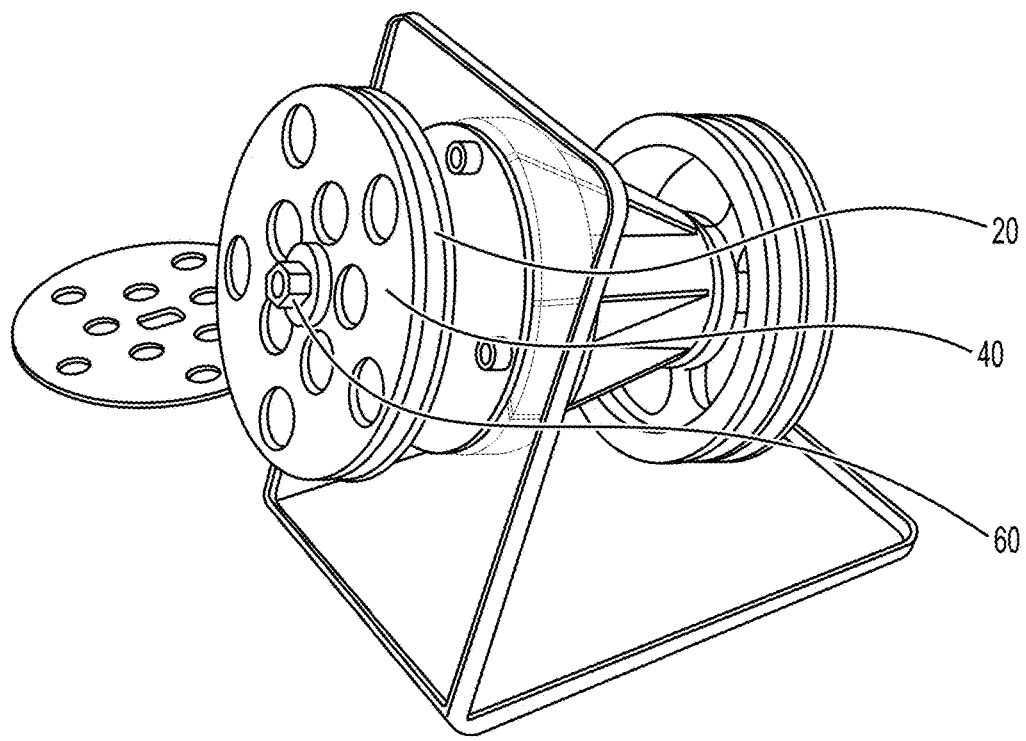
FIG. 17 is a proximal view of the process of installing one embodiment of a hub adaptor of the instant invention.
Figure 18A:
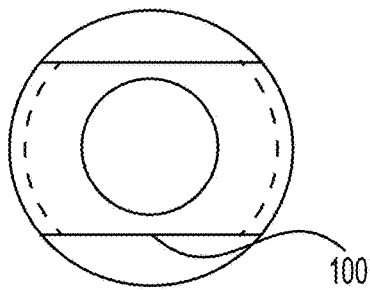
FIG. 18A is a top view of one embodiment of a hub adaptor of the instant invention.
Figure 18B:
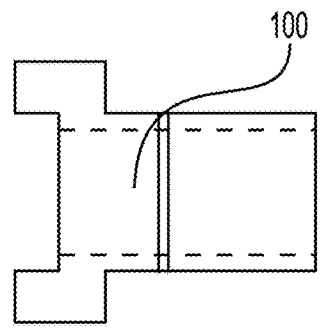
FIG. 18B is a side view of one embodiment of a hub adaptor of the instant invention.
Figure 18C:
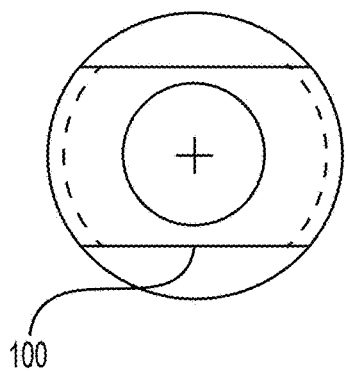
FIG. 18C is a bottom view of one embodiment of a hub adaptor of the instant invention.
Figure 18D:
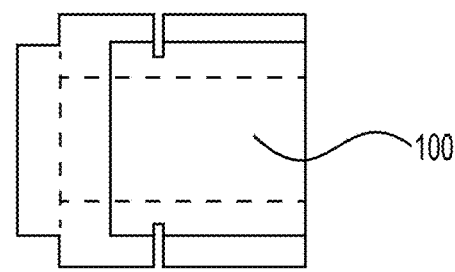
FIG. 18D is a side view of one embodiment of a hub adaptor of the instant invention.

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements. Applicant hereby incorporates by reference the entirety of U.S. patent application Ser. No. 16/389,047 (Now U.S. Pat. No. 10,785,988) filed on Apr. 19, 2019, U.S. patent application Ser. No. 16/859,268 (Now U.S. Pat. No. 11,432,556 filed on Apr. 27, 2020, and U.S. patent application Ser. No. 17/863,592 (Now U.S. Pat. No. 12,167,735 filed on Nov. 3, 2022.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The instant invention includes a hub adaptor 100 to convert an existing hub 15 to one compatible with a modern, quick change finger system. The hub adaptor includes a body 101 with a proximal end 102, a distal end 104, and an outer surface 110, a channel 106 located at the proximal end 102, the channel being formed between a first protrusion 115 and a second protrusion 120, the first protrusion 115 emanating out from the proximal end 102 and having an inner surface 116 defining a first side of the channel 106, and having an outer surface 117, a top surface 118, and a bottom surface 119, the second protrusion 120 emanating out from the proximal end 102 on the opposite side of the first protrusion 115 and having an inner surface 121 defining a second side of the channel 106 (which is substantially parallel to the first side of the channel), and having an outer surface 122, a top surface 123, and a bottom surface 124, a lumen 108 located in the center of the channel 106 and travelling through the hub adaptor 100, a first chamfer 125 located beneath the first protrusion 115, the top of the first chamfer being defined by the bottom surface 119 of the first chamfer protrusion 115, a second chamfer 128 located beneath the second protrusion 120, the top of the second chamfer being defined by the bottom surface 124 of the second protrusion 120, and a slot 112 located on the outer surface 110 of the body 101 of the hub adaptor 100.

The hub adaptor 100 can be fabricated from any material strong enough to withstand the rigors of poultry defeathering. Materials can include, but are not limited to, metals, plastics, carbon fiber, or a combination thereof. 4. The hub adaptor 100 is designed to be installed on a hub 15 by engaging the hub adaptor 100 to the hub drive shaft 30 of the hub. In one embodiment, the hub adaptor 100 is designed so that the channel 106, the inner surface 116 and the top surface 118 of the first protrusion 115, the inner surface 112 and the top surface 123 of the second protrusion 120 all engage the hub drive shaft 30. The lumen 108 of the hub adaptor 100 lines up with a threaded hole within the hub drive shaft 30 allowing a mounting bolt 60 to pass through the lumen 108 and engage the threaded hole to secure a quick change finger system.

The instant invention also includes a hub adaptor 100 to convert an existing hub to one compatible with a modern, quick change finger system. The hub adaptor 100 includes a body 101 with a proximal end 102, a distal end 104, and an outer surface 110, a channel 106 located at the proximal end 102, the channel being formed between a first protrusion 115 and a second protrusion 120. A lumen 108 is located in the center of the channel 106 and travelling through the body 101 of the hub adaptor 100. A first chamfer 125 is located beneath the first protrusion 115, the top of the first chamfer being defined by the bottom surface 119 of the first protrusion 115, and a second chamfer 128 is located beneath the second protrusion 120, the top of the second chamfer being defined by the bottom surface 124 of the second protrusion 120. The hub adaptor can further include a slot 112 located on the outer surface 110 of the body 101 of the hub adaptor 100, the slot 112 being sized to accommodate a retaining clip. This embodiment can include any of the previously mentioned elements in partial or in total.

The instant invention includes a method for modernizing conventional hub and standard finger plate systems to accommodate the MATTCO Poultry Defeathering Apparatus as described in U.S. patent application Ser. No. 16/389,047 (Now U.S. Pat. No. 10,785,988) filed on Apr. 19, 2019, U.S. patent application Ser. No. 16/859,268 (Now U.S. Pat. No. 11,432,556 filed on Apr. 27, 2020, and U.S. patent application Ser. No. 17/863,592 (Now U.S. Pat. No. 12,167,735 filed on Nov. 3, 2022, previously incorporated by reference in their entirety.

The instant invention includes a hub adaptor 100 to convert an existing hub (i.e., old fashioned finger plate assembly) which requires each individual finger to be pulled in physically by either pliers or finger pullers, to one compatible with Applicant's quick change finger system, or other systems such as a two-plate system.

The instant invention includes a method for converting a hub which requires each individual finger to be pulled in physically by either pliers or finger pullers, to one compatible with a modern, quick change finger system comprising the steps of:
  a. removing an existing finger plate 38 from a hub drive shaft 30 of the hub 15;
  b. installing a hub adaptor 100 as described in claim 6 onto the hub drive shaft 30 by:
     i. seating the hub adaptor 100 onto the hub drive shaft 30;
     ii. securing the hub adaptor onto the hub drive shaft using a mounting bolt 60 and impact driver to releasably secure the hub adaptor 100 to the hub drive shaft 30 by engaging a threaded hole within the hub drive shaft 30 allowing the mounting bolt 60 to pass through the lumen 108 and engage the threaded hole;

iii. remove the bolt;

c. installing a quick-change compression plate 20 onto the hub adaptor 100;

d. installing a quick-change finger plate 40 (with or without fingers) onto the hub adaptor 100; and e. securing the finger plate 40 in place using the bolt and a washer engaged with the threaded hole within the hub drive shaft 30.

The above method can further include the step of securing the compression plate 20 in place by engaging a retaining clip 35 with the slot 112 on the hub adaptor 100.

The Hub adaptor 100 can be secured with a bolt or any other means known in the art including, but not limited to, welding, adhesives, or other mechanical methods.

Quick-change back plate can be secured with a bolt or any other means known in the art including, but not limited to, welding, adhesives, or other mechanical methods.

Any method described herein may incorporate any design element contained within this application and any other document/application incorporated by reference herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The present invention may be embodied in other forms without departing from the spirit and the essential attributes thereof, and, accordingly, reference should be made to the appended claims, rather than to the foregoing specification, as indicating the scope of the invention. The invention illustratively disclosed herein suitably may be practiced in the absence of any element which is not specifically disclosed herein.

The invention claimed is:

1. A hub adaptor 100 to convert an existing hub to one compatible with a modern, quick change finger system comprising:

a body 101 with a proximal end 102, a distal end 104, and an outer surface 110;

a channel 106 located at the proximal end 102, the channel being formed between a first protrusion 115 and a second protrusion 120;

the first protrusion 115 emanating out from the proximal end and having an inner surface 116 defining a first side of the channel 106, and having an outer surface 117, a top surface 118, and a bottom surface 119;

the second protrusion 120 emanating out from the proximal end on the opposite side of the first protrusion 115 and having an inner surface 121 defining a second side of the channel 106, and having an outer surface 122, a top surface 123, and a bottom surface 124;

a lumen 108 located in the center of the channel 106 and travelling through the hub adaptor 100;

a first chamfer 125 located beneath the first protrusion 115, the top of the first chamfer being defined by the bottom surface 119 of the first protrusion 115;

a second chamfer 128 located beneath the second protrusion 120, the top of the second chamfer being defined by the bottom surface 124 of the second protrusion 120; and a slot 112 located on the outer surface 110 of the body 101 of the hub adaptor 100.

2. The hub adaptor of claim 1 wherein the hub adaptor 100 is made of metal.

3. The hub adaptor of claim 1 wherein the hub adaptor 100 is installed on a hub 15 by engaging the hub adaptor 100 to the hub drive shaft 30 of the hub.

4. The hub adaptor of claim 1 wherein the channel 106, the inner surface 116 and the top surface 118 of the first protrusion 115, the inner surface 112 and the top surface 123 of the second protrusion 120 all engage the hub drive shaft 30.

5. The hub adaptor of claim 1 wherein the lumen 108 lines up with a threaded hole within the hub drive shaft 30 allowing a mounting bolt 60 to pass through the lumen 108 and engage the threaded hole to secure a quick change finger system.

6. A hub adaptor 100 to convert an existing hub to one compatible with a modern, quick change finger system comprising:

a body 101 with a proximal end 102, a distal end 104, and an outer surface 110;

a channel 106 located at the proximal end 102, the channel being formed between a first protrusion 115 and a second protrusion 120;

a lumen 108 located in the center of the channel 106 and travelling through the hub adaptor 100;

a first chamfer 125 located beneath the first protrusion 115, the top of the first chamfer being defined by the bottom surface 119 of the first protrusion 115; and a second chamfer 128 located beneath the second protrusion 120, the top of the second chamfer being defined by the bottom surface 124 of the second protrusion 120.

7. The hub adaptor of claim 6 further comprising a slot 112 located on the outer surface 110 of the body 101 of the hub adaptor 100;

wherein said slot 112 being sized to accommodate a retaining clip.

8. The hub adaptor of claim 6 wherein the hub adaptor 100 is made of metal.

9. The hub adaptor of claim 6 wherein the hub adaptor 100 is installed on a hub 15 by engaging the hub adaptor 100 to the hub drive shaft 30 of the hub.

10. The hub adaptor of claim 9 wherein the channel 106, the inner surface 116 and the top surface 118 of the first protrusion 115, the inner surface 112 and the top surface 123 of the second protrusion 120 all engage the hub drive shaft 30.

11. The hub adaptor of claim 9 wherein the lumen 108 lines up with a threaded hole within the hub drive shaft 30 allowing a mounting bolt 60 to pass through the lumen 108 and engage the threaded hole to secure a quick change finger system.

12. A method for converting a hub which requires each individual finger to be pulled in physically by either pliers or finger pullers, to one compatible with a modern, quick change finger system, or other two-plate system, comprising the steps of:

a. removing an existing finger plate 38 from a hub drive shaft 30 of the hub 15;

b. installing a hub adaptor 100 as described in claim 6 onto the hub drive shaft 30 by:

i. seating the hub adaptor 100 onto the hub drive shaft 30;
ii. securing the hub adaptor onto the hub drive shaft using a mounting bolt 60 and impact driver to releasably secure the hub adaptor 100 to the hub drive shaft 30 by engaging a threaded hole within the hub drive shaft 30 allowing the mounting bolt 60 to pass through the lumen 108 and engage the threaded hole;
iii. remove the bolt;
C. installing a quick-change compression plate 20 onto the hub adaptor 100;
d. installing a quick-change finger plate 40 onto the hub adaptor 100; and
e. securing the finger plate 40 in place using the bolt engaged with the threaded hole within the hub drive shaft 30.

13. The method of claim 12 further comprising the step of:
securing the compression plate 20 in place by engaging a retaining clip 35 with the slot 112 on the hub adaptor 100.

14. The method of claim 12 wherein the hub adaptor 100 is made of metal.

15. The method of claim 12 wherein the hub adaptor 100 is installed on a hub 15 by engaging the hub adaptor 100 to the hub drive shaft 30 of the hub.

16. The method of claim 15 wherein the channel 106, the inner surface 116 and the top surface 118 of the first protrusion 115, the inner surface 112 and the top surface 123 of the second protrusion 120 all engage the hub drive shaft 30.

17. The method of claim 15 wherein the lumen 108 lines up with a threaded hole within the hub drive shaft 30 allowing a mounting bolt 60 to pass through the lumen 108 and engage the threaded hole to secure a quick change finger system.

18. The method of claim 12 wherein the compression plate 20 is secured to the hub drive shaft without the assistance of a fastener.

19. The method of claim 12 wherein the finger plate 40 is secured to the hub drive shaft without the assistance of a fastener.

* * * * *